(12) United States Patent
Fukushima et al.

(10) Patent No.: US 8,287,778 B2
(45) Date of Patent: Oct. 16, 2012

(54) ULTRAVIOLET ABSORBER COMPOSITION WITH IMPROVED HEAT RESISTANCE AND SYNTHETIC RESIN COMPOSITION CONTAINING THE SAME

(75) Inventors: Mitsuru Fukushima, Saitama (JP);
Toshitaka Yoshitake, Saitama (JP);
Tetsuo Kamimoto, Saitama (JP); Toshio Nakajima, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/144,861

(22) PCT Filed: Feb. 1, 2010

(86) PCT No.: PCT/JP2010/051326
§ 371 (c)(1),
(2), (4) Date: Jul. 15, 2011

(87) PCT Pub. No.: WO2010/095502
PCT Pub. Date: Aug. 26, 2010

(65) Prior Publication Data
US 2011/0272648 A1    Nov. 10, 2011

(30) Foreign Application Priority Data
Feb. 18, 2009 (JP) ................... 2009-035774

(51) Int. Cl.
*F21V 9/04* (2006.01)
*F21V 9/06* (2006.01)
*G02B 5/22* (2006.01)
*G02B 5/26* (2006.01)
*C07D 251/00* (2006.01)
*C07D 253/00* (2006.01)

(52) U.S. Cl. ........ 252/589; 252/403; 252/588; 428/412; 524/99; 524/100; 524/117; 524/136; 524/186; 544/180; 544/216

(58) Field of Classification Search .................. 252/403, 252/589, 588; 264/176.1; 428/412; 524/100, 524/99, 117, 136, 186; 528/196, 198, 272; 544/180, 216; 707/999.104, 999.107
See application file for complete search history.

(56) References Cited

U.S. PATENT DOCUMENTS
6,333,114 B1 *  12/2001 Tobita et al. .................. 428/412
(Continued)

FOREIGN PATENT DOCUMENTS
JP    11-071356    3/1999
(Continued)

OTHER PUBLICATIONS
International Search Report, PCT/JP2010/051326, Apr. 27, 2010.

*Primary Examiner* — Bijan Ahvazi
(74) *Attorney, Agent, or Firm* — Young & Thompson

(57) ABSTRACT

A synthetic resin composition containing, 100 parts by mass of a synthetic resin, 0.001-10 parts by mass of a triazine compound represented by (1) below, and 0.001-10 parts by mass of a diarylpentaerythritol diphosphite compound represented by general formula (2) shown below and/or 0.001-10 parts by mass of an organic cyclic phosphite compound represented by formula (3) below and/or 0.001-10 parts by mass of a hindered phenol compound represented by formula (4) below.

general formula (1)

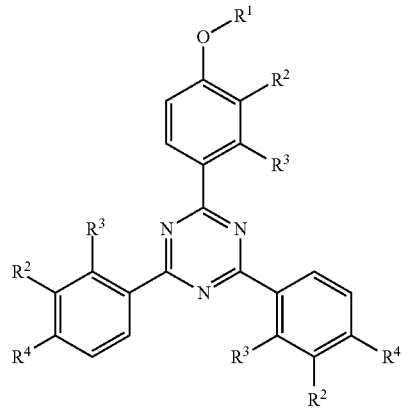

general formula (2)

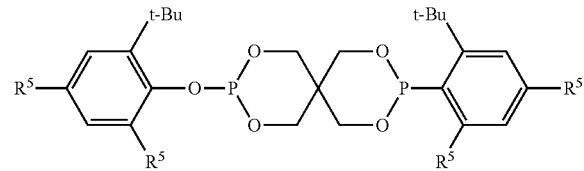

general formula (3)

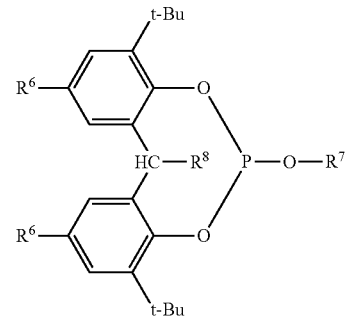

general formula (4)

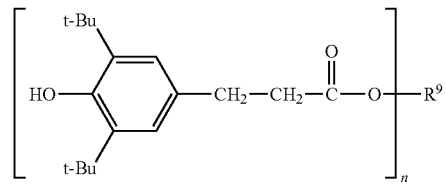

In formula (1), $R^1$ is C1-C12 alkyl group, etc.; $R^2$ is C1-C8 alkyl group, etc.; $R^3$ is hydroxyl group, etc.; and $R^4$ is —O—$R^1$, etc. In formula (2), $R^5$ is C1-C4 alkyl group, etc. In formula (3), $R^6$ and $R^8$ is each C1-C4 alkyl group, etc, and $R^7$ is C1-C18 alkyl group. In formula (4), $R^9$ is a residue remaining after removing n hydroxyl groups from a mono- to tetravalent alcohol, and n is an integer 1-4.

16 Claims, No Drawings

U.S. PATENT DOCUMENTS

| | | |
|---|---|---|
| 7,553,892 B2 | 6/2009 | Negishi et al. |
| 7,842,744 B2 | 11/2010 | Negishi et al. |
| 2004/0099849 A1 | 5/2004 | Negishi et al. |
| 2005/0282995 A1* | 12/2005 | Tobita et al. .................. 528/272 |
| 2007/0215845 A1* | 9/2007 | Negishi et al. ................ 252/588 |

FOREIGN PATENT DOCUMENTS

| | | |
|---|---|---|
| JP | 2000-313051 | 11/2000 |
| JP | 2001-324616 | 11/2001 |
| JP | 2002-249600 | 9/2002 |
| JP | 2002-302611 | 10/2002 |
| JP | 2005-054032 | 3/2005 |
| JP | 2005-225018 | 8/2005 |
| JP | 2006-001568 | 1/2006 |
| JP | 2009-185291 | 8/2009 |

* cited by examiner

ULTRAVIOLET ABSORBER COMPOSITION WITH IMPROVED HEAT RESISTANCE AND SYNTHETIC RESIN COMPOSITION CONTAINING THE SAME

TECHNICAL FIELD

This invention relates to an ultraviolet (UV) absorber composition containing a specific triazine compound and a specific phosphite compound and/or hindered phenol compound and a synthetic resin composition containing the same. More particular, the invention relates to a UV absorber composition and a synthetic resin composition which are useful in applications to optical materials, such as optical films and optical sheets, including those used in liquid crystal displays (LCDs), such as a protective film or sheet for a polarizing plate, a retardation film, a viewing angle compensation film, an antiglare film, a luminance-improving film, a diffuser film or sheet, a lens film or sheet, an antifog film, an antistatic film, and a light guide film; various substrates; various functional films used in plasma displays, such as an antireflection film; and various functional films used in organic electroluminescence (EL) displays.

BACKGROUND ART

It is known that synthetic resins, such as polyethylene, polypropylene, styrene resins, polyvinyl chloride, and polycarbonate, and organic pigments and dyes undergo deterioration, such as discoloration and reduction in mechanical strength, by the action of light so that they do not withstand long term use.

To protect these organic materials from deterioration or control the wavelengths of transmitted light, a variety of UV absorbers have hitherto been used. Known UV absorbers include benzophenone compounds, benzotriazole compounds, 2,4,6-triaryltriazine compounds, and cyanoacrylate compounds.

For example, patent literature 1 below discloses a technique of using a UV absorber, such as a benzotriazole compound or a triazine compound, in applications to optical materials. Patent literature 2 below reports a norbornene resin film containing a UV absorber.

However, the conventional UV absorber bleeds out or causes color change when added in an amount providing sufficient absorption required in optical applications.

Patent literature 3 below discloses a triazine compound, which is used in the present invention, as a UV absorber excellent in resistance to weather and heat. The compound is also reported in patent literature 4 below as a UV absorber that exhibits UV absorption suited for applications to optical films and hardly bleeds out.

Although the triazine UV absorber hardly bleeds out, exhibits UV absorption suited for applications to optical materials, and imparts resistance to thermal deterioration to synthetic resins, it has the problem of poor resistance to thermal coloration, that is, it is susceptible to coloration during, for example, high-temperature molding of synthetic resins in which it is incorporated.

CITATION LIST

Patent Literature

Patent Literature 1: JP 2002-249600A
Patent Literature 2: JP 2001-324616A
Patent Literature 3: JP 11-71356A
Patent Literature 4: US Patent Appn. 2007/215845

SUMMARY OF INVENTION

Technical Problem

An object of the invention is to provide a synthetic resin composition containing a triazine compound and having improved resistance to thermal coloration and an optical film and sheet obtained using the synthetic resin composition.

Solution to Problem

The inventors have conducted extensive investigations to improve thermal coloration resistance of a synthetic resin containing a triazine compound having a specific structure. As a result, they have found that a phosphite compound having a specific structure and/or a hindered phenol compound having a specific structure exhibit marked effects on the improvement of the thermal coloration resistance of a UV absorber per se comprising the triazine compound. The invention has been completed based on this finding.

The invention provides in its first aspect a UV absorber composition comprising 0.1% to 99.9% by mass of a triazine compound represented by general formula (1) (preferably a compound represented by general formula (5) shown below), 0% to 99.9% by mass of a diarylpentaerythritol diphosphite compound represented by general formula (2) and/or 0% to 99.9% by mass of an organic cyclic phosphite compound represented by general formula (3) and/or 0% to 99.9% by mass of a hindered phenol compound represented by general formula (4), provided that the total content of the compounds of formulae (2), (3), and (4) is 0.1% to 99.9% by mass:

[Chem. 1]

general formula (1)

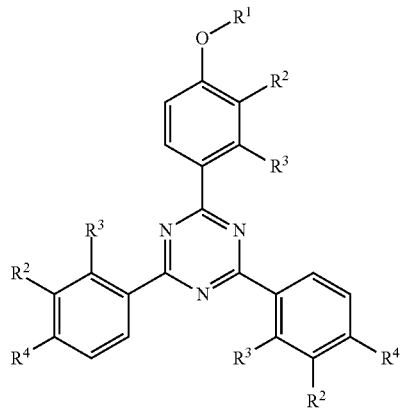

wherein $R^1$ represents a straight-chain or branched alkyl group having 1 to 12 carbon atoms, a cycloalkyl group having 3 to 8 carbon atoms, an alkenyl group having 3 to 8 carbon atoms, an aryl group having 6 to 18 carbon atoms, an alkylaryl group having 7 to 18 carbon atoms, or an arylalkyl group having 7 to 18 carbon atoms, the alkyl, cycloalkyl, alkenyl, aryl, alkylaryl, and arylalkyl being optionally substituted with a hydroxyl group, a halogen atom, an alkyl group having 1 to 12 carbon atoms, or an alkoxy group having 1 to 12 carbon atoms and optionally interrupted by an oxygen atom, a sulfur atom, a carbonyl group, an ester group, an amido group, or an imino group, the substitution and the interruption being optionally combined with each other; $R^2$ represents a hydrogen atom, an alkyl group having 1 to 8 carbon atoms, or an alkenyl group having 3 to 8 carbon atoms; $R^3$ represents a hydrogen atom or a hydroxyl group; and $R^4$ represents a hydrogen atom or —O—$R^1$;

[Chem. 2]

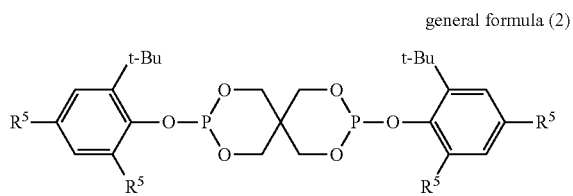

general formula (2)

wherein each of $R^5$ independently represents a hydrogen atom or an alkyl group having 1 to 4 carbon atoms;

[Chem. 3]

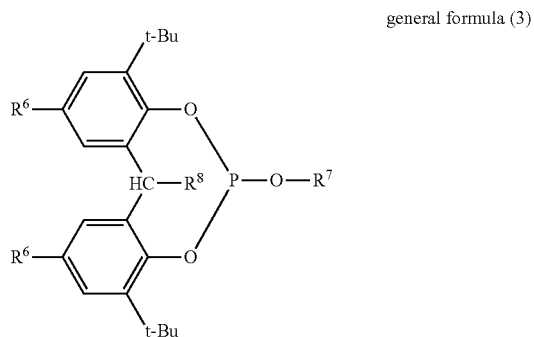

general formula (3)

wherein $R^6$ and $R^8$ each independently represents a hydrogen atom or an alkyl group having 1 to 4 carbon atoms; and $R^7$ represents an alkyl group having 1 to 18 carbon atoms;

[Chem. 4]

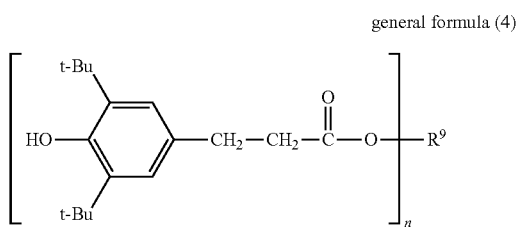

general formula (4)

wherein $R^9$ represents a residue remaining after removing n hydroxyl groups from a mono- to tetrahydric alcohol; and n represents an integer of 1 to 4.

[Chem. 5]

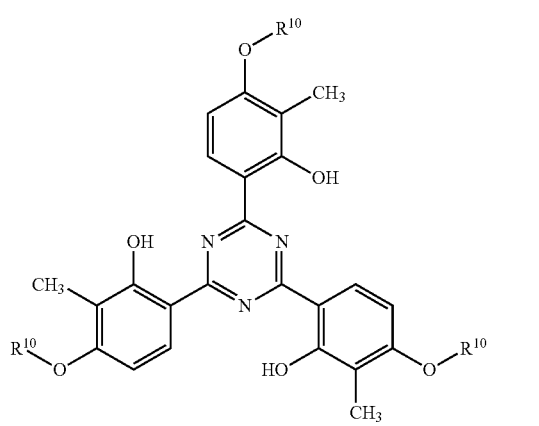

general formula (5)

wherein $R^{10}$ represents a straight-chain or branched alkyl group having 1 to 12 carbon atoms, the alkyl being optionally substituted with a hydroxyl group, a halogen atom, or an alkoxy group and optionally interrupted by an oxygen atom, a sulfur atom, a carbonyl group, an ester group, an amido group, or an imino group.

The invention provides in its second aspect a synthetic resin composition comprising 100 parts by mass of a synthetic resin (preferably an acrylic ester resin, a polycarbonate resin, a polyethylene terephthalate resin, a polyethylene naphthalate resin, a polystyrene resin, a cellulose ester resin, a cycloolefin resin, or a norbornene resin), 0.001 to 10 parts by mass of the triazine compound of the general formula (1) (preferably the compound of the general formula (5)), 0.001 to 10 parts by mass of the diarylpentaerythritol diphosphite compound of the general formula (2) and/or 0.001 to 10 parts by mass of the organic cyclic phosphite compound of the general formula (3) and/or 0.001 to 10 parts by mass of the hindered phenol compound of the general formula (4).

The invention provides in its third aspect a film or sheet (particularly an optical film or sheet, more particularly a protective film or sheet for a polarizing plate) comprising the synthetic resin composition.

Effect of the Invention

The invention allows for providing a synthetic resin composition with improved thermal coloration resistance and an optical film and sheet made from the synthetic resin composition.

DESCRIPTION OF EMBODIMENTS

The UV absorber composition, synthetic resin composition, and optical film and sheet made from the resin composition according to the invention will be described in detail based on their preferred embodiments.

The UV absorber composition of the invention will be described first.

The UV absorber composition of the invention contains 0.1% to 99.9% by mass of a triazine compound of the general formula (1), 0% to 99.9% by mass of a diarylpentaerythritol diphosphite compound of the general formula (2) and/or 0% to 99.9% by mass of an organic cyclic phosphite compound of the general formula (3) and/or 0% to 99.9% by mass of a hindered phenol compound of the general formula (4).

Examples of the C1-C12 straight chain or branched alkyl group represented by $R^1$ in the general formula (1) include methyl, ethyl, propyl, isopropyl, butyl, isobutyl, sec-butyl, tert-butyl, amyl, isoamyl, tert-amyl, hexyl, heptyl, n-octyl, isooctyl, tert-octyl, 2-ethylhexyl, nonyl, isononyl, decyl, undecyl, and dodecyl.

Examples of the C3-C8 cycloalkyl group represented by $R^1$ in the general formula (1) include cyclopropyl, cyclopentyl, cyclohexyl, and cycloheptyl.

Examples of the C6-C18 aryl group and the C7-C18 alkylaryl group represented by $R^1$ in the general formula (1) include phenyl, naphthyl, 2-methylphenyl, 3-methylphenyl, 4-methylphenyl, 4-vinylphenyl, 3-isopropylphenyl, 4-isopropylphenyl, 4-butylphenyl, 4-isobutylphenyl, 4-tert-butylphenyl, 4-hexylphenyl, 4-cyclohexylphenyl, 4-octylphenyl, 4-(2-ethylhexyl)phenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4-di-tert-butylphenyl, 2,5-di-tert-butylphenyl, 2,6-di-tert-butylphenyl, 2,4-di-tert-pentylphenyl, 2,5-di-tert-amylphenyl, 2,5-di-tert-octylphenyl, biphenyl, and 2,4,5-trimethylphenyl. Examples of the C7-C18 arylalkyl include benzyl, phenethyl, 2-phenylpropan-2-yl, and diphenylmethyl.

Examples of the C3-C8 alkenyl group represented by $R^1$ or $R^2$ in the general formula (1) include propenyl, butenyl, pentenyl, hexenyl, heptenyl, and octenyl, each of which may be straight-chain or branched and may have the unsaturated bond at any position.

Examples of the C1-C8 alkyl group represented by $R^2$ in the general formula (1) include methyl, ethyl, propyl, isopropyl, butyl, sec-butyl, tert-butyl, isobutyl, amyl, tert-amyl, octyl, and tert-octyl, with methyl being preferred for high UV absorption.

Examples of the triazine compound of the general formula (1) include compound Nos. 1 through 8 shown below.

[Chem. 6]

Compound No. 1

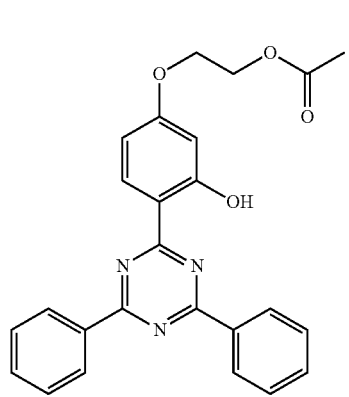

[Chem. 7]

Compound No. 2

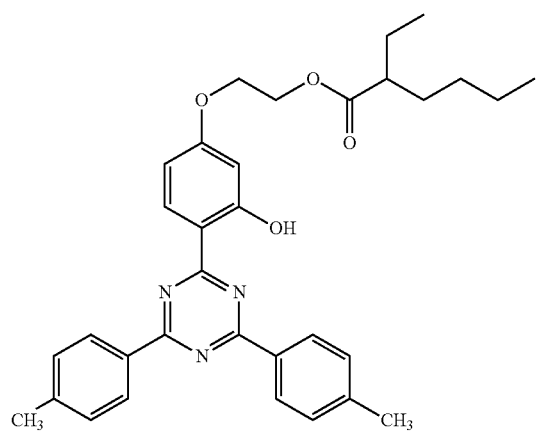

[Chem. 8]

Compound No. 3

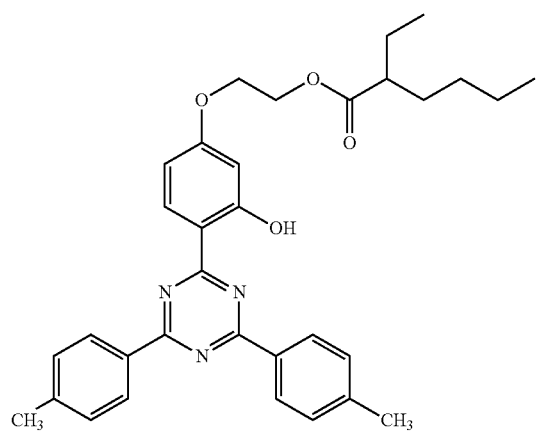

[Chem. 9]

Compound No. 4

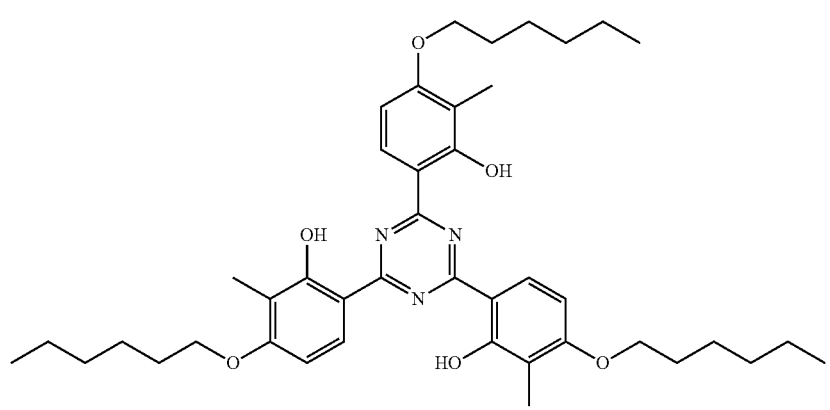

-continued
[Chem. 10]
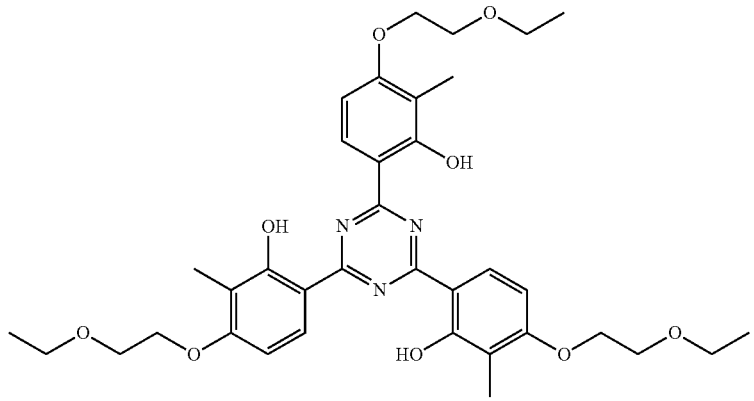
Compound No. 5
[Chem. 11]
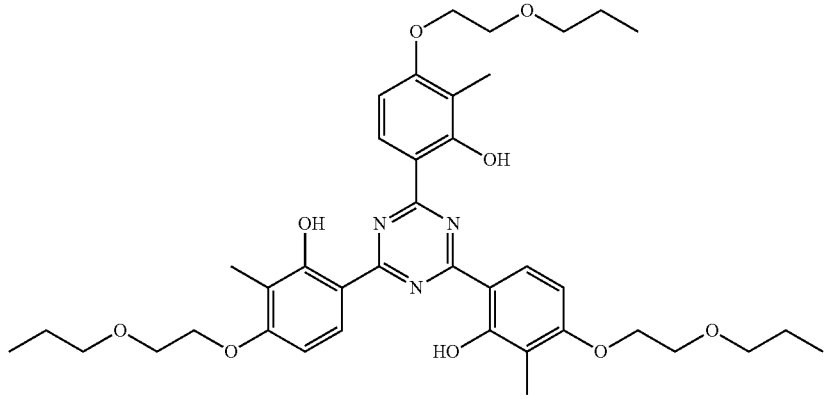
Compound No. 6
[Chem. 12]
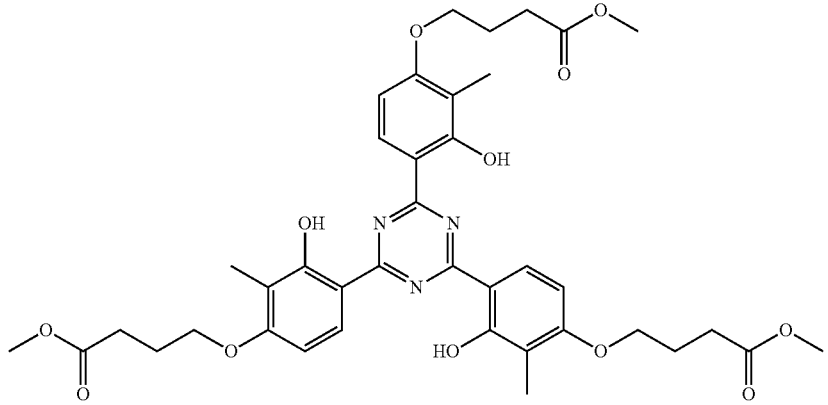
Compound No. 7

[Chem. 13]

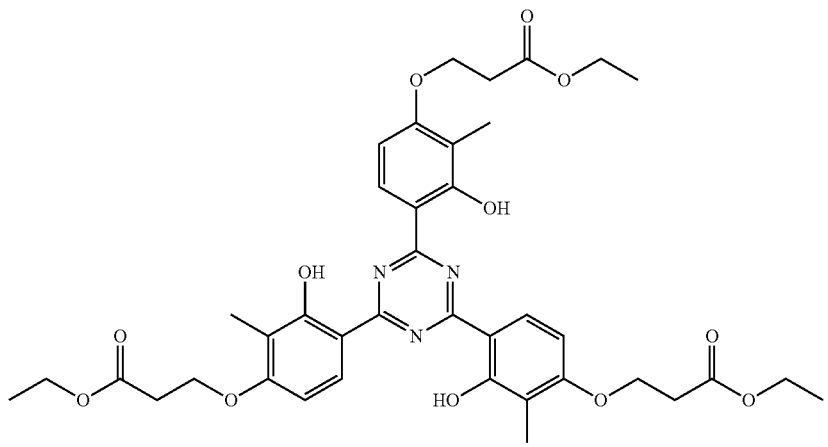

Compound No. 8

Of the triazine compounds of the general formula (1) preferred are those represented by the general formula (5) in terms of UV absorption and, from the aspect of synthetic resin physical properties, thermal coloration resistance.

The C 1-C12 alkyl group represented by $R^{10}$ in the general formula (5) is exemplified by the same groups as described for $R^1$.

The triazine compound of the general formula (1) or (5) may be synthesized by any commonly used process with no particular restriction. For example, it may be synthesized by addition reaction between cyanuric chloride and a phenol derivative or a resorcinol derivative using aluminum trichloride. The substituents $R^1$ ($R^{10}$), $R^2$, $R^3$, and $R^4$ may be introduced after the formation of a triazine structure or may be introduced into the phenol compound or resorcinol derivative before the formation of a triazine structure.

The content of the triazine compound of the general formula (1) or (5) in the UV absorber composition is 0.1% to 99.9%, preferably 1% to 99%, by mass. At less than 0.1% by mass, necessary UV absorption may not be obtained. At more than 99.9% by mass, the effect on thermal coloration resistance tends to reduce.

Examples of the C1-C4 alkyl group represented by $R^5$ in the general formula (2) include methyl, ethyl, propyl, isopropyl, butyl, isobutyl, sec-butyl, and tert-butyl, with methyl being preferred in terms of ease of synthesis and effect on thermal coloration resistance.

Examples of the C1-C4 alkyl group represented by $R^6$ in the general formula (3) include methyl, ethyl, propyl, isopropyl, butyl, sec-butyl, tert-butyl, and isobutyl, with tert-butyl being preferred in terms of the effects of the invention.

Examples of the C1-C18 alkyl group represented by $R^7$ in the general formula (3) include methyl, ethyl, propyl, isopropyl, butyl, sec-butyl, tert-butyl, isobutyl, amyl, isoamyl, tert-amyl, hexyl, heptyl, 2-heptyl, isoheptyl, tert-heptyl, n-octyl, isooctyl, tert-octyl, 2-ethylhexyl, nonyl, isononyl, decyl, undecyl, dodecyl, tridecyl, tetradecyl, pentadecyl, hexadecyl, heptadecyl, and octadecyl. Examples of the substituted or interrupted alkyl include chloromethyl, dichloromethyl, trichloromethyl, 2-hydroxyethyl, 2-hydroxypropyl, 3-hydroxypropyl, 2-methoxyethyl, 2-ethoxyethyl, 2-butoxyethyl, 2-methoxypropyl, 3-methoxypropyl, 2,3-dihydroxypropyl, 2-hydroxy-3-methoxypropyl, 2,3-dimethoxypropyl, and 2-(2-methoxyethoxy)ethyl, with 2-ethylhexyl being preferred in terms of the effects of the invention.

In the general formula (3), $R^8$ is a hydrogen atom or a C1-4 alkyl group which is exemplified by the same groups given for $R^6$. $R^8$ is preferably a hydrogen atom in view of the effects of the invention.

Examples of the organic cyclic phosphite compound of the general formula (3) include compound Nos. 9 through 11 shown below.

[Chem. 14]

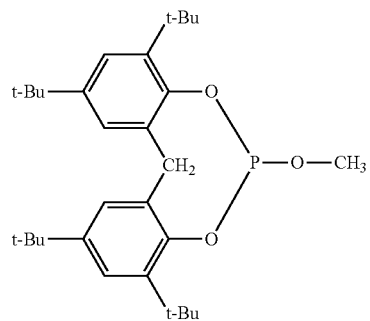

Compound No. 9

[Chem. 15]

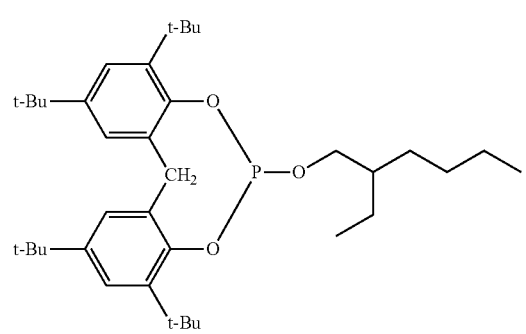

Compound No. 10

-continued

[Chem. 16]

Compound No. 11

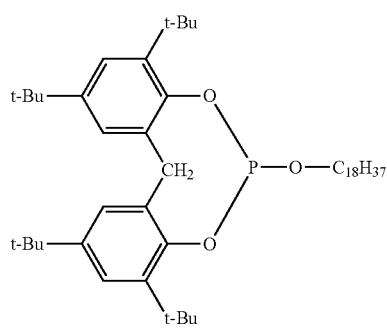

In the general formula (4), $R^9$ is a residue remaining after removing n (n=integer of 1 to 4) hydroxyl groups from a mono- to tetrahydric alcohol. Examples of the mono- to tetrahydric alcohol include monohydric alcohols, such as methanol, ethanol, butanol, octanol, 2-ethylhexanol, decanol, dodecanol, tridecanol, isotridecanol, tetradecanol, hexadecanol, octadecanol, eicosanol, docosanol, and triacontanol; dihydric alcohols, such as ethylene glycol, diethylene glycol, triethylene glycol, thiodiethanol, propylene glycol, butylene glycol, neopentyl glycol, 1,6-hexanediol, 1,10-decanediol, 2,2-bis(4-(2-hydroxyethoxy)phenyl)propane, and 3,9-bis(1,1-dimethyl-2-hydroxyethyl)-2,4,8,10-tetraoxaspiro[5,5]undecane; trihydric alcohols, such as glycerol, trimethylolethane, trimethylolpropane, and tris(2-hydroxyethyl)isocyanurate; and tetrahydric alcohols, such as pentaerythritol, ditrimethylolethane, ditrimethylolpropane, and diglycerol. $R^9$ is preferably a residue remaining after removing four hydroxyl groups from pentaerythritol in terms of the effects of the invention.

Examples of the hindered phenol compounds of the general formula (4) are stearyl 3-(3,5-di-tert-butyl-4-hydroxyphenyl)propionate, hexamethylenebis(3-(3,5-di-tert-butyl-4-hydroxyphenyl)propionate), thiodiethylenebis(3-(3,5-di-tert-butyl-4-hydroxyphenyl)propionate), 2,2-bis(4-(2-(3-(3,5-di-tert-butyl-4-hydroxyphenyl)propionyloxy)ethyl)phenyl)propane, tris(2-(3-(3,5-di-tert-butyl-4-hydroxyphenyl)propionyloxy)ethyl)isocyanurate, and tetrakis(3-(3,5-di-t-butyl-4-hydroxyphenyl)propionyloxymethyl)methane.

The compounds of the general formulae (2) to (4) may be synthesized through any ordinary organic synthesis with no particular restriction. The product as synthesized may be purified by an appropriate method, such as distillation, recrystallization, reprecipitation, filtration, or treatment with an adsorbent. The compounds of the general formulae (2) to (4) which are commercially available at low cost are usually supplied as a mixture, and they may be used either individually or as a mixture irrespective of the process of manufacture, composition, melting point, acid value, and so on.

The content of each of the phosphite compounds and/or hindered phenol compound of the general formulae (2) to (4) in the UV absorber composition of the invention is from 0% to 99.9%, preferably 0.1% of 99%, by mass, with the proviso that the total content of the phosphite compounds and/or hindered phenol compound of the general formulae (2) to (4) in the UV absorber composition of the invention is from 0.1% to 99.9% by mass. If the total content is less than 0.1% by mass, a sufficient effect on thermal coloration resistance is not exhibited. At a total content exceeding 99.9% by mass, the UV absorption tends to reduce.

The above illustrated UV absorber composition of the invention is incorporated into a synthetic resin hereinafter described to provide a useful synthetic resin composition.

The synthetic resin composition of the invention will then be described.

The synthetic resin composition of the invention includes 100 parts by mass of a synthetic resin, 0.001 to 10 parts by mass of the triazine compound of the general formula (1), and 0.001 to 10 parts by mass of the diarylpentaerythritol diphosphite compound of the general formula (2) and/or 0.001 to 10 parts by mass of the organic cyclic phosphite compound of the general formula (3) and/or 0.001 to 10 parts by mass of the hindered phenol compound of the general formula (4).

Examples of the synthetic resin for use in the invention include polyolefin resins, such as high density polyethylene, isotactic polypropylene, syndiotactic polypropylene, hemiisotactic polypropylene, polybutene-1, poly(3-methyl-1-butene), poly(3-methyl-1-pentene), poly(4-methyl-1-pentene), an ethylene-propylene block or random copolymer, an ethylene-vinyl acetate copolymer, and an olefin-maleimide copolymer, and copolymers composed of monomers providing these olefin polymers; halogen-containing resins, such as polyvinyl chloride, polyvinylidene chloride, chlorinated polyethylene, polyvinylidene fluoride, chlorinated rubber, vinyl chloride-vinyl acetate copolymers, vinyl chloride-ethylene copolymers, vinyl chloride-vinylidene chloride-vinyl acetate terpolymers, vinyl chloride-acrylic ester copolymers, vinyl chloride-maleic ester copolymers, and vinyl chloride-cyclohexylmaleimide copolymers; polyester resins, such as polyethylene terephthalate (PET), polybutylene terephthalate (PBT), polyethylene naphthalate (PEN), poly-1,4-cyclohexanedimethylene terephthalate, polyethylene-1,2-diphenoxyethane-4,4'-dicarboxylate, and polyhexamethylene terephthalate; styrene resins, such as polystyrene, high impact polystyrene (HIPS), acrylonitrile butadiene styrene copolymers (ABS), acrylonitrile chlorinated polyethylene styrene copolymers (ACS), styrene acrylonitrile copolymers (SAN), acrylonitrile butyl acrylate styrene copolymers (AAS), butadiene styrene copolymers, styrene maleic acid copolymers, styrene maleimide copolymers, acrylonitrile ethylene propylene styrene copolymers (AES), and butadiene methyl methacrylate styrene copolymers (MBS); polycarbonate resins, such as polycarbonate and branched polycarbonate; polyamide resins, including polyamides using aromatic or alicyclic dicarboxylic acids, such as polyhexamethyleneadipamide (nylon 66), polycaprolactam (nylon 6), and nylon 6T; polyphenylene oxide (PPO) resins; modified polyphenylene oxide resins; polyphenylene sulfide (PPS) resins; polyacetal (POM); modified polyacetal; polysulfone; polyether sulfone; polyether ketone; polyether imide; polyoxyethylene; petroleum resins; chroman resins; cycloolefin resins, such as norbornene resins, cycloolefin-olefin copolymer resins; polyvinyl acetate resins; polyvinyl alcohol resins; acrylic resins, such as polymethyl methacrylate; polycarbonate/styrene resin polymer alloys; polyvinyl alcohol resins; cellulose resins, such as diacetyl cellulose, triacetyl cellulose (TAC), propionyl cellulose, butyryl cellulose, acetylpropionyl cellulose, and nitrocellulose; liquid crystal polymers (LCP); silicone resins; urethane resins; biodegradable resins, such as aliphatic polyesters obtained from aliphatic dicarboxylic acids, aliphatic diols, aliphatic hydroxycarboxylic acids, or cyclic derivatives thereof and the aliphatic polyesters having molecular weights increased by using a diisocyanate compound; and recycled resins thereof. Further included are thermosetting resins, such as phenol resins, urea resins, melamine resins, epoxy resins, and unsaturated polyester resins. Rubbery polymers are also useful, such as natural rubber (NR), polyisoprene rubber (IR), styrene butadiene rubber (SBR), polybutadiene rubber (BR), ethylene-propylene-diene rubber (EPDM), butyl rubber (IIR), chloroprene rubber, acrylonitrile butadiene rubber (NBR), and silicone rubber. For applications to optical materials, polycarbonate resins, polyethylene terephthalate resins, polyethylene naphthalate resins, cellulose ester resins, such as cellulose triacetate and cellulose acetate butyrate, acrylic ester resins, such as polymethyl acrylate and polymethyl methacrylate, cycloolefin resins, polystyrene resins, and norbornene resins, all of which are excellent in visible light transmittance, are preferred for their excellence in transparency, durability, polarization characteristics, and electrical insulating properties.

The description of the triazine compound of the general formula (1) or (5), the diarylpentaerythritol diphosphite compound of the general formula (2), the organic cyclic phosphite compound of the general formula (3), and the hindered phenol compound of the general formula (4) given with respect to the UV absorber composition appropriately applies to the corresponding compounds for use in the synthetic resin composition.

The amount of the triazine compound of the general formula (1) or (5) to be added to a synthetic resin is 0.001 to 10 parts, preferably 0.01 to 5 parts, by mass per 100 parts by mass of the synthetic resin. At less than 0.001 parts by mass, a sufficient stabilization effect is not obtained. At more than 10 parts by mass, problems, such as a reduction in physical properties of the resin and impairment of the appearance of the resin composition due to blooming, occur.

The amount of each of the phosphite compounds and hindered phenol compound of the general formulae (2) to (4) to be added to a synthetic resin is 0.001 to 10 parts, preferably 0.01 to 5 parts, by mass per 100 parts by mass of the synthetic resin. The total amount of the phosphite compounds and hindered phenol compound of the general formulae (2) to (4) should be within the range of from 0.001 to 10 parts by mass per 100 parts by mass of the synthetic resin. When the total amount is less than 0.001 parts by mass, a sufficient inhibitory effect on thermal coloration is not exhibited. If it exceeds 10 parts by mass, problems, such as a reduction in physical properties of the synthetic resin and impairment of the appearance of the synthetic resin due to bleeding, occur.

The synthetic resin composition of the invention may contain commonly used additives in accordance with the resin, such as other antioxidants (e.g., phenol antioxidants, phosphorous antioxidants, or thioether antioxidants), other UV absorbers (e.g., benzotriazole UV absorbers, other triazine UV absorbers, and benzophenone UV absorbers), hindered amine light stabilizers, plasticizers, and processing aids.

Examples of the phenol antioxidant include 2,6-di-tert-butyl-p-cresol, 2,6-diphenyl-4-octadecyloxyphenol, 4,4'-thiobis(6-tert-butyl-m-cresol), 2,2'-methylidenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, thiodiethylene glycol bis[(3,5-di-tert-butyl-4-hydroxyphenyl) propionate], bis[3,3-bis(4-hydroxy-3-tert-butylphenyl)butyric acid] glycol ester, bis[2-tert-butyl-4-methyl-6-(2-hydroxy-3-tert-butyl-5-methylbenzyl)phenyl] terephthalate, 1,3,5-tris[(3,5-di-tert-butyl-4-hydroxyphenyl) propionyloxyethyl] isocyanurate, 3,9-bis[1,1-dimethyl-2-{(3-tert-butyl-4-hydroxy-5-methylphenyl) prionyloxy} ethyl]-2,4, 8,10-tetraoxaspiro[5.5]undecane, and triethylene glycol bis[(3-tert-butyl-4-hydroxy-5-methylphenyl)propionate. The phenol antioxidant is used in an amount preferably of 0.001 to 10 parts, more preferably 0.05 to 5 parts, by mass per 100 parts by mass of the synthetic resin.

Examples of the phosphorus antioxidant include trisnonylphenyl phosphite, tris[2-tert-butyl-4-(3-tert-butyl-4-hydroxy-5-methylphenylthio)-5-methylphenyl] phosphite, tridecyl phosphite, octyldiphenyl phosphite, di(decyl) monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,4-dicumylphenyl) pentaerythritol diphosphite, tetra(tridecyl) isopropylidenediphenol diphosphite, tetra(tridecyl)-4,4'-n-butylidenebis(2-tert-butyl-5-methylphenol) diphosphite, hexa(tridecyl)-1,1,3-tris(2-methyl-4-hydroxy-5-tert-butylphenyl)butane triphosphite, 9,10-dihydro-9-oxa-10-phosphaphenanthrene 10-oxide, 2,2'-ethylidenebis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl) amine, and 2-ethyl-2-butyl propylene glycol 2,4,6-tri-tert-butylphenol phosphite.

Examples of the thioether antioxidant include dialkyl thiodipropionates, such as dilauryl thiodipropionate, dimyristyl thiodipropionate, and distearyl thiodipropionate, and β-alkylmercaptopropionic acid polyol esters, such as pentaerythritol tetra(β-dodecylmercaptopropionate).

Examples of the benzotriazole UV absorbers include 2-(2'-hydroxyphenyl)benzotriazoles, such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3', 5'-dicumylphenyl)benzotriazole, 2-(2'-hydroxy-3'-tert-butyl-5'-carboxyphenyl)benzotriazole, and 2,2'-methylenebis(4-tert-octyl-6-benzotriazolyl)phenol.

Examples of the triazine UV absorbers include triaryltriazines, such as 2-(2-hydroxy-4-octoxyphenyl)-4,6-bis(2,4-dimethylphenyl)-s-triazine, 2-(2-hydroxy-4-hexyloxyphenyl)-4,6-diphenyl-s-triazine, 2-(2-hydroxy-4-propoxy-5-methylphenyl)-4,6-bis(2,4-dimethylphenyl)-s-triazine, 2-(2-hydroxy-4-hexyloxyphenyl)-4,6-dibiphenyl-s-triazine, 2,4-bis(2-hydroxy-4-octoxyphenyl)-6-(2,4-dimethylphenyl)-s-triazine, and 2,4,6-tris(2-hydroxy-4-octoxyphenyl)-s-triazine.

Examples of the benzophenone UV absorbers include 2-hydroxybenzophenones, such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone).

Examples of the hindered amine light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis (1,2,2,6,6-pentamethyl-4-piperidyl) sebacate, bis(1-octoxy-2,2,6,6-tetramethyl-4-piperidyl) sebacate, 1,2,2,6,6-pentamethyl-4-piperidyl methacrylate, 2,2,6,6-tetramethyl-piperidyl methacrylate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis (2,2,6,6-tetramethyl-4-piperidyl) bis(tridecyl)-1,2,3,4-butanetetracarboxylate, bis(1,2,2,6,6-pentamethyl-4-piperidyl) bis(tridecyl) 1,2,3,4-butanetetracarboxylate, bis(1, 2,2,6,6-pentamethyl-4-piperidyl) 2-butyl-2-(3,5-di-tertbutyl-4-hydroxybenzyl)malonate, 3,9-bis[1,1-dimethyl-2-[tris(2,2,6,6-tetramethyl-4-piperidyloxycarbonyloxy) butylcarbonyloxy]ethyl]-2,4,8,10-tetraoxaspiro[5.5] undecane, 3,9-bis[1,1-dimethyl-2-[tris(1,2,2,6,6-pentamethyl-4-piperidyloxycarbonyloxy)butylcarbonyloxy] ethyl]-2,4,8,10-tetraoxaspiro[5.5]undecane, 1,6-bis(2,2,6,6-tetramethyl-4-piperidyl amino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl) amino)-s-triazin-6-yl]-1,5,8,12-tetraazadodecane, 1,6,11-tris[2,4-bis(N-butyl-N-(2,2,6,6-tetramethyl-4-piperidyl) amino)-s-triazin-6-ylamino]undecane, 1,6,11-tris[2,4-bis(N-butyl-N-(1,2,2,6,6-pentamethyl-4-piperidyl)amino)-s-triazin-6-ylamino]undecane, 1-(2-hydroxyethyl)-2,2,6,6-tetramethyl-4-piperidinol/diethyl succinate polycondensate, and 1,6-bis(2,2,6,6-tetramethyl-4-piperidylamino)hexane/dibromoethane polycondensate.

It is preferred for the other antioxidants, UV absorbers, and hindered amine light stabilizers to have a structure providing high solubility in the base resin and to have a high molecular weight, specifically 500 or more, more preferably 700 or more, to be sparingly volatile with heat applied in processing or on use. The other antioxidants and UV absorbers may have a polymerizable group or a reactive group introduced therein to gain in molecular weight or to be incorporated into a resin molecule. The amount of the other antioxidants and UV absorbers to be used is preferably 0.01 to 10 parts, more preferably 0.05 to 5 parts, by mass per 100 parts by mass of the synthetic resin.

Useful plasticizers include, but are not limited to, phosphoric ester plasticizers and polyester plasticizers. These plasticizers may be used either alone or in combination of two or more thereof.

Examples of the phosphoric ester plasticizers include triphenyl phosphate, tricresyl phosphate, cresyldiphenyl phosphate, octyldiphenyl phosphate, diphenylbiphenyl phosphate, trioctyl phosphate, and tributyl phosphate.

Examples of the polyester plasticizers are acyclic polyesters composed of an aliphatic or aromatic dibasic acid and a diol compound and acyclic polyesters of hydroxycarboxylic acids.

Examples of the aliphatic dibasic acid include oxalic acid, malonic acid, succinic acid, glutaric acid, adipic acid, pimelic acid, azelaic acid, sebacic acid, fumaric acid, 2,2-dimethylglutaric acid, suberic acid, 1,3-cyclopentanedicarboxylic acid, 1,4-cyclohexanedicarboxylic acid, 1,3-cyclohexanedicarboxylic acid, diglycolic acid, itaconic acid, maleic acid, and 2,5-norbornenedicarboxylic acid. Examples of the aromatic dibasic acid include phthalic acid, 1,5-naphthalenedicarboxylic acid, 2,6-naphthalenedicarboxylic acid, biphenyldicarboxylic acid, anthracenedicarboxylic acid, and terphenyldicarboxylic acid.

Examples of the diol compound include ethylene glycol, propylene glycol, 1,3-propanediol, 1,2-butanediol, 1,3-butanediol, 1,4-butanediol, 2-methylpropanediol, 1,3-dimethylpropanediol, 1,5-pentanediol, 2,2-dimethyl-1,3-propanediol, 1,6-hexanediol, 3-methyl-1,5-pentanediol, 1,9-nonanediol, 2,2,4-trimethyl-1,6-hexanediol, 2-ethyl-2-butylpropanediol, diethylene glycol, triethylene glycol, tetraethylene glycol, dipropylene glycol, tripropylene glycol, tetrapropylene glycol, thiodiethylene glycol, 1,3-cyclohexanedimethanol, 1,4-cyclohexanedimethanol, 2,2,4,4-tetramethyl-1,3-cyclobutanediol, and 3,9-bis(2-hydroxy-1,1-dimethylethyl)-2,4,8,10-tetraoxaspiro[5,5] undecane.

Examples of the hydroxycarboxylic acid are 4-hydroxymethylcyclohexanecarboxylic acid, hydroxytrimethylacetic acid, 6-hydroxycapronic acid, glycolic acid, and lactic acid.

Other polyester plasticizers include those formed between tri- or higher functional polyols and monocarboxylic acid compounds. Examples of the tri- or higher functional polyols include glycerol, trimethylolpropane, pentaerythritol, sorbitol, and condensates thereof, e.g., dipentaerythritol and tripentaerythritol. Polyether polyols obtained by adding an alkylene oxide (e.g., ethylene oxide) to these polyols are also useful.

Examples of the monocarboxylic acid include aromatic carboxylic acids, such as benzoic acid, p-methylbenzoic acid, m-methylbenzoic acid, dimethylbenzoic acid, p-tert-butylbenzoic acid, p-methoxybenzoic acid, p-chlorobenzoic acid, naphthylic acid, and biphenylcarboxylic acid; alicyclic carboxylic acids, such as cyclohexanecarboxylic acid; and aliphatic carboxylic acids, such as acetic acid, propionic acid, and 2-ethylhexanoic acid. These monocarboxylic acids may be used either individually or as a mixture thereof.

The amount of the plasticizer to be used preferably ranges from 0 to 20% by mass relative to the synthetic resin in terms of synthetic resin properties and processing properties. For use in an element of LCDs, the amount is more preferably 1% to 15% by mass, even more preferably 2% to 10% by mass in terms of dimensional stability. The polyester plasticizers are particularly preferred from the standpoint of hydrolysis.

In the preparation of the synthetic resin composition of the invention, the order of mixing the synthetic resin, the triazine compound, phosphite compound, and hindered phenol compound of the general formulae (1) to (5), and the above discussed additives is not particularly limited. All the components may be mixed up at once, the synthetic resin may be mixed with a separately prepared UV absorber composition, a separately prepared mixture of a plurality of components may be mixed with the others, or separately prepared mixtures of a plurality of components may be mixed together.

When a separately prepared UV absorber composition is compounded into a synthetic resin to provide the synthetic resin composition of the invention, the UV absorber composition is used preferably in an amount of 0.05 to 10 parts by mass, more preferably 0.1 to 5 parts by mass, per 100 parts by mass of the synthetic resin.

The above described synthetic resin composition of the invention is expected to be advantageous in that it exhibits good adhesion to a substrate (e.g., a polarizing plate), provides a resin film with stable physical properties, and does not stain an adjacent element because the triazine compound, phosphite compound, and hindered phenol compound of the general formulae (1) to (5) have high solubility in the synthetic resins recited above, particularly those suited for use as an optical material, such as acrylic ester resins, polycarbonate resins, polyethylene terephthalate resins, polyethylene naphthalate resins, polystyrene resins, cellulose ester resins, and norbornene resins.

While the application of the synthetic resin composition of the invention is not particularly limited, the synthetic resin composition is suitably formed into sheet or film for use as an optical material, such as an optical film or sheet. It is also useful as a material of coatings. The optical material is exemplified by optical films or sheets in image display apparatus, such as liquid crystal displays (LCDs), plasma display panels (PDPs), electroluminescence displays (ELDs), cathode ray tube displays (CRTs), fluorescent display tubes, and field emission displays. The synthetic resin composition is especially useful as optical films in LCDs or organic ELDs which contain in their display elements organic materials having poor UV resistance. The optical films used in organic ELDs include an optical correction film and a protective film for a light emitting element. The optical films or sheets used in LCDs include a protective film or sheet for a polarizing plate, a retardation film, a retardation film, a viewing angle compensation film, an antiglare film, a luminance-improving film, a diffuser film or sheet, a lens film or sheet, an antifog film, an antistatic film, an optical correction film, an antireflection film, a color adjusting film, and a light guide film. In particular, the synthetic resin composition is suitable for use as an optical film or sheet disposed on the outer side of a polarizing plate provided in contact with a liquid crystal cell or a protective film or sheet for a polarizing plate.

Application of the synthetic resin composition of the invention as an optical film or sheet will be described.

The optical film or sheet according to the invention is obtained by molding the synthetic resin composition of the invention into film or sheet. The molding may be performed in a conventional manner, such as solvent casting, injection molding, or melt extrusion. The film or sheet thickness is not particularly limited. The thickness of a molded film is preferably 5 to 300 μm, more preferably 5 to 150 μm, and that of a molded sheet is preferably 200 μm to 10 mm, more preferably 300 μm to 5 mm.

Since the triazine compound, phosphite compounds, and hindered phenol compound of the general formulae (1) to (4) contained in the synthetic resin composition have good resistance against volatilization, the optical film or sheet of the invention may advantageously be obtained by solvent casting, injection molding, or melt extrusion using the synthetic resin composition under high temperature conditions (e.g., 200° to 350° C.), which are highly productive.

An LCD having the optical film or sheet of the invention is superior in retention of polarizing ability. The optical film or sheet is suitably applicable to any type of LCDs irrespective of the driving mode (e.g., TN, STN, or TFT), the light source (e.g., a backlight, a fluorescent lamp, or an LED), whether or not external light such as sunlight is used (i.e., whether reflective or transmissive), whether with or without an added display function (such as a touch panel function), or whether with or without, or a degree of, a measure for functional improvement.

EXAMPLES

The invention will now be illustrated in greater detail with reference to Examples, but it should be understood that the invention is not deemed to be limited thereto. Unless otherwise noted, all the parts are by mass.

Example 1 and Comparative Example 1

A mixture of 1 part of the triazine compound shown in Table 1 or 2 below and 0.02 parts of the phosphite compound or the hindered phenol compound shown in Table 1 or 2 was put in a test tube, heated in a dry block bath at 300° C. for 15 minutes, and cooled at room temperature for 1 hour. The degree of coloration after cooling was observed with the naked eye and rated according to the following rating system. The results obtained are shown in Tables 1 and 2.

Rating System For Evaluating Coloration By Visual Observation (1 to 5 scale)

1: Faintly colored (pale yellow)
2: Lightly colored (yellowish brown)
3: Medium colored (reddish brown)
4: Deeply colored (blackish brown)
5: Blackened

TABLE 1

|  | Example | | |
| --- | --- | --- | --- |
|  | 1-1 | 1-2 | 1-3 |
| Compound of General Formula (1) | No. 4 | No. 4 | No. 7 |
| Compound of General Formula (2), (3) or (4) | No. 10 | No. 12 | No. 12 |
| Comparative Compound | — | — | — |
| Coloration (visual observation) | 1 | 1 | 2 |

[Chem. 17]

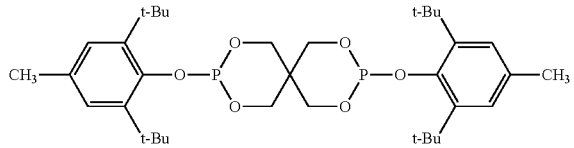

Compound No. 12

TABLE 2

|  | Comparative Example | | | | | | |
| --- | --- | --- | --- | --- | --- | --- | --- |
|  | 1-1 | 1-2 | 1-3 | 1-4 | 1-5 | 1-6 | 1-7 |
| Compound of General Formula (1) | No. 4 | No. 4 | No. 4 | No. 4 | No. 4 | No. 4 | No. 4 |
| Compound of General Formula (2), (3) or (4) | — | — | — | — | — | — | — |
| Comparative Compound | No. 13 | No. 14 | No. 15 | No. 16 | No. 17 | No. 18 | — |
| Coloration (visual observation) | 5 | 5 | 5 | 5 | 5 | 5 | 5 |

[Chem. 18]

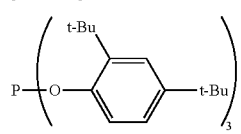

Compound No. 13

TABLE 2-continued
|  | Comparative Example | | | | | | |
|---|---|---|---|---|---|---|---|
|  | 1-1 | 1-2 | 1-3 | 1-4 | 1-5 | 1-6 | 1-7 |
[Chem. 19]
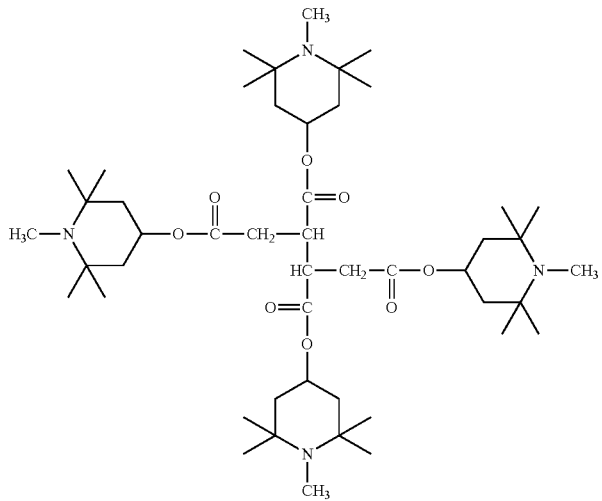
Compound No. 14
[Chem. 20]
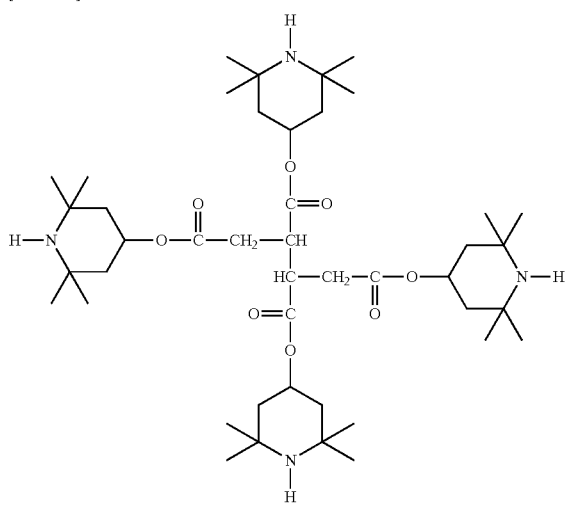
Compound No. 15
[Chem. 21]
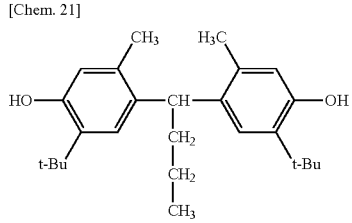
Compound No. 16

TABLE 2-continued

|  | Comparative Example | | | | | | |
|---|---|---|---|---|---|---|---|
|  | 1-1 | 1-2 | 1-3 | 1-4 | 1-5 | 1-6 | 1-7 |

[Chem. 22]

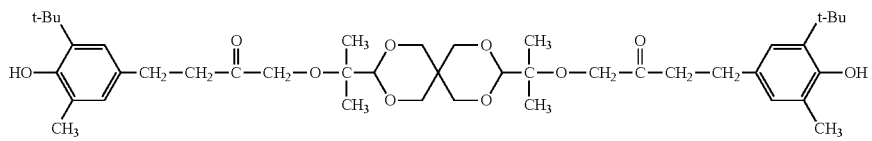

Compound No. 17

[Chem. 23]

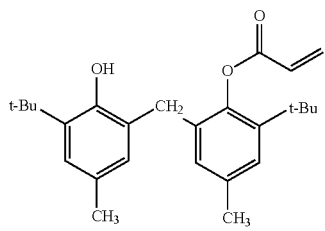

Compound No. 18

Example 2 and Comparative Example 2

Making of Pellets

A hundred parts of the synthetic resin shown in Table 3 or 4 below, 1 part of the compound No. 4, and the compound(s) shown in tables were compounded, and the resulting mixture was extruded using an extruder Laboplastomill Micro (from Toyo Seiki Kogyo) into pellets at the processing temperature shown in the tables.

The synthetic resins used were as follows.

PC: Polycarbonate resin: E-2000, from Mitsubishi Engineering Plastics
NBE: Norbornene resin: ARTON F5023, from JSR
PET: Polyethylene terephthalate resin: TR-8550, from Teijin Chemicals
PS: Polystyrene resin: reagent code: 182427, from Aldrich
PMMA: Methacrylic resin: Acrypet VH000, from Mitsubishi Rayon
CAB: Cellulose acetate butyrate resin: CAB 381-20, from Eastman Chemical

Method of Evaluating Thermal Coloration Resistance

To evaluate thermal coloration resistance, the yellow index (Y.I.) in reflection of the pellets was measured using a spectrophotometric colorimeter with multiple light sources from Suga Test Instruments. The results obtained are shown in Tables 3 and 4.

TABLE 3

|  | Example | | | | | | | Comparative Example | | |
|---|---|---|---|---|---|---|---|---|---|---|
|  | 2-1-1 | 2-1-2 | 2-1-3 | 2-2-1 | 2-3-1 | 2-3-2 | 2-3-3 | 2-1 | 2-2 | 2-3 |
| Synthetic Resin | PC | | | PET | NBE | | | PC | PET | NBE |
| Processing Temp. (° C.) | 260 | | | 280 | 260 | | | 260 | 280 | 260 |
| Compound No. 12 | 0.05 | — | 0.05 | 0.05 | 0.05 | — | 0.05 | — | — | — |
| Compound No. 19 | — | 0.05 | 0.05 | 0.05 | — | 0.05 | 0.05 | — | — | — |
| Y.I. (reflection) | 41.4 | 44.2 | 39.5 | 33.0 | 34.8 | 35.3 | 34.1 | 46.7 | 37.0 | 37.1 |

TABLE 4

| | Example | | | | | | Comparative Example | | |
|---|---|---|---|---|---|---|---|---|---|
| | 2-4-1 | 2-4-2 | 2-5-1 | 2-5-2 | 2-6-1 | 2-6-2 | 2-4 | 2-5 | 2-6 |
| Synthetic Resin | PS | | PMMA | | CAB | | PS | PMMA | CAB |
| Processing Temp. (° C.) | 230 | | 260 | | 220 | | 230 | 260 | 220 |
| Compound No. 12 | 0.05 | 0.05 | — | 0.05 | 0.05 | 0.05 | — | — | — |
| Compound No. 19 | — | 0.05 | 0.05 | 0.05 | — | 0.05 | — | — | — |
| Y.I. (reflection) | 41.0 | 40.5 | 37.1 | 37.0 | 58.1 | 56.4 | 43.5 | 40.1 | 62.0 |

[Chem. 24]

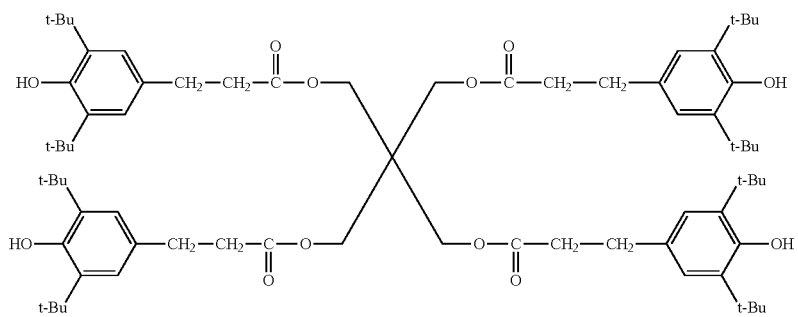

Compound No. 19

It is seen from the results in Tables 1 through 4 that the triazine compound having a specific structure according to the invention brings about a remarkable improvement on thermal coloration resistance (ΔY.I.) in various synthetic resins only when combined with the phosphite compound(s) and/or hindered amine compound having specific structures according to the invention.

The specific phosphite compounds and/or hindered phenol compound according to the invention are considerably effective in improving thermal coloration resistance of the triazine compound-containing synthetic resin of the invention and provide a UV absorbent composition and a synthetic resin composition containing the UV absorbent composition, both of which exhibit excellent resistance to thermal discoloration. In particular, they are very useful in improving the thermal coloration resistance of synthetic resins used in optical films and sheet.

The invention claimed is:

1. An ultraviolet absorber composition comprising:

0.1% to 99.9% by mass of a triazine compound represented by general formula (5); and one or more of:

0% to 99.9% by mass of a diarylpentaerythritol diphosphite compound represented by general formula (2);

0% to 99.9% by mass of an organic cyclic phosphite compound represented by general formula (3); and 0% to 99.9% by mass of a hindered phenol compound represented by general formula (4), provided that the total content of the compounds of the general formulae (2), (3), and (4) is 0.1% to 99.9% by mass,

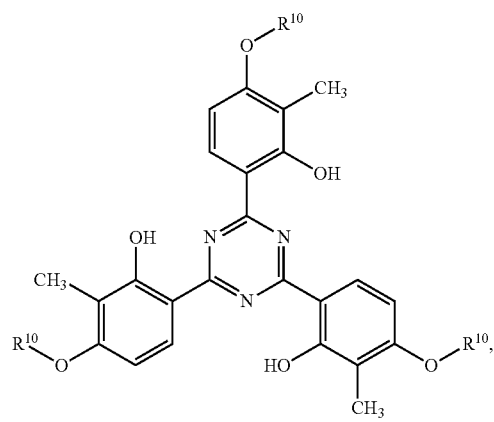

general formula (5)

wherein $R^{10}$ represents a straight-chain or branched alkyl group having 1 to 12 carbon atoms, the alkyl being optionally substituted with a hydroxyl group, a halogen atom, or an alkoxy group and optionally interrupted by an oxygen atom, a sulfur atom, a carbonyl group, an ester group, an amido group, or an imino group;

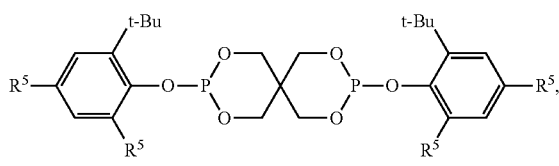

general formula (2)

wherein each of $R^5$ independently represents a hydrogen atom or an alkyl group having 1 to 4 carbon atoms;

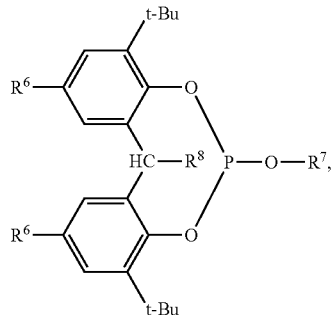

general formula (3)

wherein $R^6$ and $R^8$ each independently represents a hydrogen atom or an alkyl group having 1 to 4 carbon atoms; and $R^7$ represents an alkyl group having 1 to 18 carbon atoms;

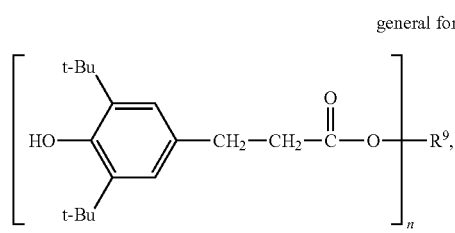

general formula (4)

wherein $R^9$ represents a residue remaining after removing n hydroxyl groups from a mono- to tetrahydric alcohol; and n represents an integer of 1 to 4.

2. The ultraviolet absorber composition according to claim 1, wherein $R^5$ in general formula (2) is a methyl group.

3. The ultraviolet absorber composition according to claim 2, wherein in general formula (3), $R^6$ is a tert-butyl group, $R^7$ is a 2-ethylhexyl group, and $R^8$ is a hydrogen atom.

4. The ultraviolet absorber composition according to claim 2, wherein $R^9$ in general formula (4) is a residue remaining after removing four hydroxyl groups from pentaerythritol.

5. The ultraviolet absorber composition according to claim 1, wherein in general formula (3), $R^6$ is a tert-butyl group, $R^7$ is a 2-ethylhexyl group, and $R^8$ is a hydrogen atom.

6. The ultraviolet absorber composition according to claim 1, wherein $R^9$ in general formula (4) is a residue remaining after removing four hydroxyl groups from pentaerythritol.

7. A synthetic resin composition comprising: a synthetic resin; and the ultraviolet absorber composition according to claim 1.

8. The synthetic resin composition according to claim 7, wherein $R^5$ in general formula (2) is a methyl group.

9. The synthetic resin composition according to claim 7, wherein in general formula (3), $R^6$ is a tert-butyl group, $R^7$ is a 2-ethylhexyl group, and $R^8$ is a hydrogen atom.

10. The synthetic resin composition according to claim 7, wherein $R^9$ in general formula (4) is a residue remaining after removing four hydroxyl groups from pentaerythritol.

11. The synthetic resin composition according to claim 7, wherein the synthetic resin is an acrylic ester resin, a polycarbonate resin, a polyethylene terephthalate resin, a polyethylene naphthalate resin, a polystyrene resin, a cellulose ester resin, a cycloolefin resin, or a norbornene resin.

12. A film or sheet comprising the synthetic resin composition according to claim 7.

13. The film or sheet according to claim 12, which is an optical film or sheet.

14. The film or sheet according to claim 13, which is an optical film or sheet adapted to be disposed on an outer side of a polarizing plate disposed in contact with a liquid crystal cell or a protective film or sheet for the polarizing plate.

15. The film or sheet according to claim 14, which is a protective film or sheet for the polarizing plate.

16. The synthetic resin composition according to claim 7, comprising:
    100 parts by mass of the synthetic resin;
    0.001 to 10 parts by mass of a triazine compound represented by general formula (5);
and one or more of:
    0.001 to 10 parts by mass of a diarylpentaerythritol diphosphite compound represented by general formula (2);
    0.001 to 10 parts by mass of an organic cyclic phosphite compound represented by general formula (3); and
    0.001 to 10 parts by mass of a hindered phenol compound represented by general formula (4).

* * * * *